United States Patent Office 3,499,836

Patented Mar. 10, 1970

3,499,836

LOW PRESSURE, SULFUR-MODIFIED CATALYTIC REFORMING PROCESS

John C. Hayes, Palatine, and Roy T. Mitsche, McHenry, Ill., assignors to Universal Oil Products Company, Des Plaines, Ill., a corporation of Delaware

No Drawing. Filed Dec. 11, 1967, Ser. No. 689,262

Int. Cl. C10g *35/08*

U.S. Cl. 208—138 8 Claims

ABSTRACT OF THE DISCLOSURE

Concerns an improvement in a process for the reforming of a hydrocarbon stream boiling in the gasoline range at a pressure of about 50 p.s.i.g. to 250 p.s.i.g. to produce an aromatic-rich reformate having a high octane number. In this process a low octane gasoline stock, hydrogen, and sulfur are contacted in a water-free environment with a catalytic composite containing a platinum group component at conditions favoring the production of aromatics. Problem involves the acquisition and retention for commercially significant periods of a superior yield-octane relationship which is characteristic of the practice of a low pressure reforming process. Improved solution embodied herein comprehends the utilization of a reforming catalyst containing a platinum metal composited with an alumina matrix having finely divided aluminosilicate crystallites suspended therein in an amount of about 0.5 wt. percent to about 1.5 wt. percent of the alumina matrix.

DISCLOSURE

The subject of the present invention is an improvement in a catalytic reforming process wherein a low octane hydrocarbon fraction boiling in the gasoline range is converted, at high yields, into an aromatic-rich reformate. More precisely, the present invention relates to an improved process for transforming, with minimum yield loss, a hydrocarbon charge stock having low aromatics content, and corresponding low octane number, into a product stock having a substantially higher concentration of aromatics with attendant high octane number. The conception of the present invention was a product of a number of recent developments associated with low pressure reforming system. First, for reasons that will be discussed hereinafter, it was found that it is essential that controlled concentrations of hydrogen sulfide be present in a reforming system using a catalyst containing a platinum group component at low system pressures. Coupled with this was the recognition of the detrimental effects of even small concentrations of water when its is present in such a sulfur-modified system. Now we have additionally found for a reforming system operated with sulfur inclusion and water exclusion at low system pressure, that the reforming catalyst used therein can be modified by the incorporation of a critical amount of aluminosilicate crystallites therein, to effect a further improvement in the performance of the process. More specifically, we have found that a catalyst containing a platinum metal component composited with an alumina matrix having finely divided, aluminosilicate crystallites suspended therein in an amount of about 0.5 to 1.5 wt. percent of the alumina matrix, enables the performance of such a reforming system to be improved.

It is well known in the art that the requirements for optimum process for transforming low octane charge stocks into high octane product stocks, at minimum loss to undesired products, involves a dual-function catalyst, a reaction environment, and process conditions, designed to promote octane-upgrading reactions for paraffins and naphthenes. Paraffins are undoubtedly the component of gasolines that have the highest octane-improving potential, since many of the straight-chain paraffins are in the 0–50 range of the octane scale. For paraffins, the upgrading reactions are: isomerization of the relatively straight-chain paraffins to more highly branched paraffins, dehydrogeneration to olefins, dehydrocyclization to aromatics, and selective hydrocracking to lower molecular weight, more highly branched paraffins. Of these, the dehydrocyclization reaction is the one yielding the maximum gain in octane number, and is consequently preferred. Since this dehydrocyclization reaction releases four moles of hydrogen, it is obviously favored by low hydrogen partial pressure and by low total system pressure.

Naphthenes, on the other hand, are not as potentially productive of octane as are paraffins, since the clear research octane number of most naphthenes is in the range of 65–80. Nevertheless, they are a substantial source of octane improvement via the upgrading reactions of dehydrogenation to aromatics and of ring isomerization followed by dehydrogenation to aromatics. Since one mole of naphthenes will typically produce one mole of aromatics and three moles of hydrogen, these reactions are similarly favored by low hydrogen partial pressure and by low total system pressure.

Besides these upgrading reactions, it is clear that a substantial number of other reactions are present to some extent in a typical reforming operation. These, as is true with any complex set of reaction mechanisms are injected into the overall picture by the uncontrollable side phenomena that are produced by a myriad of factors that color and complicate the actual operation of a real process. Examples of these side reactions are: demethylation and dealkylation of alkylaromatics and alkylnaphthenes, ring-opening of naphthenes, excessive hydrocrcaking of aliphatics to light gases, thermal cracking of non-aromatic hydrocarbons, dehydrogenation and condensation of aromatics to form polynuclear aromatics which are carbonaceous deposit percursors, acid-catalyzed polymerization and alkylation with olefins and other highly reactive components to yield high molecular weight products which, after further dehydrogenation, can contribute to the carbonization of the catalyst, etc. For purposes of discussion here, these side reactions are conveniently divided into those that are associative such as condensation, polymerization, etc., and those that are dissociative such as cracking and hydrocracking. The associative reactions are generally the chief culprits in the observed principal mechanisms of catalyst deactivation in reforming: the formation of carbonaceous deposits on the catalyst. It is clear that these association reactions are generally net producers of hydrogen and are consequently, promoted by low hydrogen partial pressure and low system pressure. On the other hand, it is evident that the dissociation reactions generally consume hydrogen and are promoted by high hydrogen partial pressure.

Considering that the previously mentioned principal upgrading reactions are net producers of hydrogen, they, likewise, are inhibited by high hydrogen partial pressure and by high system pressure. Viewed from the prospective of hydrogen and pressure interaction, a greatly simplified picture of a typical reforming operation becomes: low partial pressure of hydrogen coupled with low system pressure promote the desired upgrading reactions and at the same time promote associaton reactions which via a carbonization mechanism deactivate the catalyst; while high hydrogen partial pressure in conjunction with high system pressure adversely effect the desired upgrading reactions, promote stability by inhibiting the association reactions and result in yield losses via promotion of dissociation reactions. Consequently, the entire picture typically becomes a balance between the minimum hydrogen partial pressure required to maintain a clean catalyst surface and the relative effects of this minimum partial pressure on the hydrogen-consuming and hydrogen-producing reactions.

It has been found that if a controlled concentration of hydrogen sulfide is present in a reforming zone and water is substantially excluded, a reforming process can be designed to take advantage of the favorable effects of low system pressure while avoiding some of the hereinbefore discussed adverse effects. Apparently, what happens is that the sulfur acts to inhibit the association reactions that tend to carbonize the catalyst. Without the intention of being limited thereto, our view of the mechanism of how these beneficial effects are achieved involves the well-known affinity of hydrogen sulfide for the platinum metal sites of the catalyst. Assuming that a typical reforming catalyst has excessive activity at low pressures for the upgrading reactions of interest and, further, that this excessive activity is reflected in a greater tendency to accelerate association reactions that carbonize the catalyst, the hydrogen sulfide acts to moderate the activity of the platinum metal sites through some kind of continuous adsorption/desorption mechanism. On the other hand, the water-exclusion requirement is dictated by water's effect on the hydrocracking reaction at low hydrogen partial pressure; it apparently acts as a promoter for this type of reaction which, when uncontrolled, can cause hydrogen partial pressure to fall, rapid carbonization of the catalyst, radical alterations in product yield structure, and process instability. Another reason for this water-exclusion requirement is the accelerating effect of the simultaneous presence of water and sulfur on undesired crystallite agglomeration reaction under these conditions, which reaction, if unchecked, can cause permanent catalyst deactivation.

Regardless of theoretical considerations, it has been established that the inclusion of sulfur and the exclusion of water are essential conditions for the achievement of a stable low pressure reforming system, utilizing a platinum metal-containing catalyst. It is to be understood that the stability of such a system is conveniently measured relative to the stability experienced in infrequently regenerated high pressure reforming systems of the prior art. And these two conditions enable a level of stability to be achieved at low pressures which is comparable to that heretofore achieved at higher pressures (i.e. 300 to 600 p.s.i.g.), and thus these essential limitations allow an infrequently regenerated low pressure reforming system to become feasible. This contrasts with the typical solution of the prior art which involved resorting to a continuously regenerating system in order to operate at this pressure condition. Despite the improvement associated with the use of these two conditions. There is still substantial room for further improvements in the performance of such a low pressure, sulfur-modified reforming system—particularly, in the areas of yield and temperature stability; but, of necessity, these improvements are not of the same order of magnitude of those resulting from the use of sulfur and the exclusion of water. We have now found such a further improvement, and the enabling condition for its achievement involves the use, in a sulfur-modified reforming system, of a reforming catalyst containing a platinum metal composited with an alumina matrix having a critical concentration of about 0.5 wt. percent to about 1.5 wt. percent of a finely divided, crystalline aluminosilicate suspended therein.

It is, accordingly, an object of the present invention to provide an improvement in a sulfur-modified, low pressure reforming system employing a platinum metal-containing catalyst. Another object is to provide a method for improving the activity stability of a sulfur-modified reforming system. Yet another object is to provide improved $C_5+$ yield in a sulfur-modified, low pressure reforming system.

In a broad embodiment, our invention relates to an improvement in a low pressure process for reforming a hydrocarbon stream boiling in the gasoline range. In this process the hydrocarbon stream and hydrogen are contacted, in a conversion zone, with a reforming catalyst containing a platinum group component at reforming conditions including a pressure of about 50 to 250 p.s.i.g. Moreover, this contacting is performed in a conversion zone which is maintained substantially free of water, and into which sulfur enters in an amount of about 10 p.p.m to about 3000 p.p.m. based on the weight of the hydrocarbon stream charged thereto. Our improvement involves: contacting the hydrocarbon stream and hydrogen with a reforming catalyst containing a platinum metal composited with an alumina matrix having a finely divided crystalline aluminosilicate suspended therein in an amount of about 0.5 wt. percent to about 1.5 wt. percent of the alumina matrix.

Other objects and embodiments of the present invention relate to details about: the charge stock that is processed therein, the sulfur compound used to achieve the desired amounts of sulfur, the catalyst employed, the mechanisms of attaining the sulfur levels used therein, and the like particulars. These will become evident from the following detailed explanation of each of the elements of the present invention.

Before considering in detail the various ramifications of the present invention, it is convenient to define several of the terms, phrases, and expressions used in the specification and in the appended claims. In those instances where temperatures are given to boiling ranges and boiling points, it is understood that they have reference to those when they are obtained through the use of standard ASTM distillation methods. The phrase "hydrocarbon stream" is intended to refer to a portion of a petroleum crude oil, of a mixture of synthesized hydrocarbons, of a coal tar distillate, of a shale oil, etc., that boils within a given temperature range. The expression "sulfur entering the reforming zone" is to be construed to mean the total quantity of equivalent sulfur entering the reforming zone as elemental sulfur or in sulfur-containing compounds. The amounts of sulfur given herein are calculated as weight parts of equivalent sulfur per million weight parts of the hydrocarbon charge stock. The expression "substantially free from water" refers to the situation where the total water and water-producing substances entering the reforming zone from any source is less than 20 p.p.m. by weight based on the hydrocarbon charge stock, calculated as equivalent weight of water. The term "activity" when it is applied to reforming operations refer to the ability of the process to produce, at specified conditions, a reformate product of the required quality as measured by octane number. The term "stability" when it is applied to the reforming process refers to the rate of change of the operating parameters associated with the process; for instance, a common measure of stability is the rate of change of reactor temperature that is required to maintain a given octane number in output product—the smaller slope implying the more stable process. The phrase "platinum metal" embraces all the members of the platinum group as well as compounds and mixtures of any of these. The "liquid hourly space velocity" is defined to be the equivalent liquid volume of the charge stock flowing over the bed of catalyst per hour divided by the volume of the reforming zone containing catalyst. The terms "conversion zone" and "reforming zone" are used interchangeably herein to denote one or more reactor vessels containing catalyst.

The hydrocarbon streams that can be converted in accordance with the process of the present invention comprises hydrocarbon streams containing naphthenes and paraffins. The preferred charge stocks are those consisting essentially of naphthenes and paraffins although in some cases aromatics and/or olefins are also present. The preferred class includes straight run gasolines, natural gasolines, synthetic gasolines, and the like. On the other hand, it is frequently advantageous to charge thermally or catalytically cracked gasolines or higher boiling fractions thereof to the improved reforming process of the present invention. Mixtures of straight run and cracked gasoline can also be used. The gasoline charge stock may be a full boiling range gasoline having an initial boiling point of from about 50° F. to about 100° F. and an end boiling point within the range of from about 325 to 425° F., or may be a selected fraction thereof which usually will be a higher boiling fraction commonly referred to as a heavy naphtha—for example, a naphtha boiling in the range $C_7$ to 400° F. containing paraffins and naphthenes. It is also possible to charge to the process of the present invention pure hydrocarbons or mixtures of hydrocarbons, usually paraffins or naphthenes, which are to be converted to aromatics.

The charge stock for the process of the present invention must be carefully controlled in the areas of concentrations of sulfur-containing compounds and of oxygen-containing compounds. In general, it is preferred that the concentration of both of these constituents be reduced to low levels by any suitable pretreating means; that is, less than 10 p.p.m. calculated as water or sulfur respectively. This is not to be construed to exclude the possibility that the concentration of sulfur-containing compounds in the charge stock could be carefully adjusted in order to furnish the required amount of sulfur to the reforming zone; but this latter method is difficult to control and is, consequently, not preferred. In any event, it is necessary that the total concentration of water and of water-yielding substances in the charge stock be reduced to at least 10 p.p.m. calculated as equivalent water. These restrictions are doubly significant in one preferred embodiment of the present invention, in which the hydrogen gas, contained in the effluent from the reforming zone is separated and recycled to the reforming zone, because a portion of the water and hydrogen sulfide contained therein, will also be recycled with this hydrogen-rich gas. Accordingly, the concentration of these constituents will tend to build up to an equilibrium level in this recycle stream and small amounts of these materials in the input stream may, if the process is not carefully controlled, build up to substantial undesired levels in the recycle stream.

In general, then, it is preferred to first reduce the sulfur and oxygen concentration of the charge stock to very low levels, and thereafter inject a controlled amount of a sulfur additive (a hydrogen sulfide-yielding compound) into the conversion zone. Any reducible sulfur-containing compound, that does not contain oxygen, which is converted to the hydrogen sulfide by reaction with hydrogen at the conditions in the conversion zone may be used. This class includes: aliphatic mercaptans such as ethyl mercaptan, propyl mercaptans, tertiary butyl mercaptans, etc.; aromatic mercaptans such as thiophenol and derivations; naphthenic mercaptans such as cyclohexyl mercaptan; aliphatic sulfides such as ethylsulfide; aromatic sulfides such as phenyl sulfide; aliphatic disulfides such as tertiary butyl disulfide; aromatic disulfides such as phenyl disulfide; dithioacids; thioaldehydes, thioketones, heterocyclic sulfur compounds such as the thiophenes and thiophanes; and the like compounds. In addition, free sulfur or hydrogen sulfide may be used if desired. Usually, a mercaptan such as tertiary butyl mercaptan or heptyl mercaptan is the preferred additive for reasons of cost and convenience.

Regardless of which sulfur additive is used, it is clear that it may be added directly to the reforming zone independently of any input stream, or that it may be added to either the charge stock or the hydrogen stream or both of these. For example, one acceptable method would involve the addition of hydrogen sulfide to the hydrogen stream. However, the preferred procedure involves the admixture of the sulfur additive with the charge stock prior to its passage into the reforming zone.

In general, the amount of sulfur entering the reforming zone is a function of residual sulfur in the charge stock, the amount of sulfur added to the charge stock, the amount of sulfur in the hydrogen stream, and the amount added directly to the zone. Regardless of the source of the sulfur entering the zone, we have found that the total amount of sulfur continuously entering the reforming zone from all sources must be in the range of about 10 p.p.m. to about 3000 p.p.m. based on weight of charge stock entering the reforming zone. Furthermore, we have found that in one embodiment of the present invention in which a substantial portion of the hydrogen gas in the effluent from the reforming zone is recycled without treatment to remove $H_2S$ that the above limitation requires that a sulfur additive be continuously present in the charge stock in an amount of about 5 p.p.m. to about 1500 p.p.m.

As hereinabove set forth, the process of the present invention utilizes a catalyst containing a platinum metal. Although the process of the present invention is specifically directed to the use of a catalytic composite containing platinum, it is intended to include other platinum-group metals such as palladium, rhodium, ruthenium, etc. The platinum-group metallic component, such as platinum, may exist, within the final catalytic composite as a compound such as an oxide, sulfide, halide, etc. or as the elemental metal. Generally, the amount of the metallic component contained in the catalyst is small compared to the quantities of the other components combined therewith. For example, platinum and/or palladium, or other metals from the platinum-group, will generally comprise from about 0.01% to about 3.0% by weight of the total catalyst calculated on an elemental basis, and usually from about 0.1% to about 2.0% by weight.

Whatever the metallic component, it is an essential feature of the present invention that it is composited with an alumina matrix having a critical concentration of crystalline aluminosilicates suspended therein. In the present specification, the term "alumina" is employed to mean porous aluminum oxide in all states of oxidation and in all states of hydration, as well as aluminum hydroxide. Whatever type of alumina is employed, it may be activated prior to use by one or more treatments including drying, calcination, steaming, etc. It may be in a form known as activated alumina, activated alumina of commerce, porous alumina, alumina gel, etc.

The crystalline aluminosilicates are composed of $SiO_4$ and $AlO_4$ tetrahedra with a silicon or aluminum atom being at the center of four oxygen atoms which in turn are shared with other surrounding tetrahedra. These aluminosilicates are geometrically arranged to form a pore structure having sufficiently large pore mouths to permit the reactant molecules to pass into the pore structure. Preferably the aluminosilicates employed in the catalyst support have pore mouths of from about 5 up to about 15 angstroms in cross-sectional diameter. The aluminosilicates are treated to improve their catalytic activity by techniques such as ion-exchange with suitable cations and thermal treatment. Ordinarily, the aluminosilicates are synthetically prepared in the alkali metal form (usually sodium) and there is one monovalent alkali metal cation associated with each aluminum centered tetrahedra (to maintain electrical neutrality). The aluminosilicates may be ion-exchanged with polyvalent cations such as calcium, magnesium, beryllium, rare earths, etc., to replace a substantial amount of the monovalent cations. This causes one polyvalent cation to be associated with more than one aluminum centered tetrahedra and if these tetrahedra are spread sufficiently far apart (due to the presence of silicon centered tetrahedra), areas of local electrical charge will be formed which aid in promoting catalytic reactions. Another treating technique to improve the catalytic activity of the aluminosilicates is to ion-exchange with ammonium ions followed by thermal treatment, preferably above 300° C. to convert the crystalline aluminosilicate to the hydrogen form.

There are numerous types of crystalline aluminosilicates both synthetic and naturally occurring that are suitable for use in the present invention. Especially preferred are the hydrogen and polyvalent forms of faujasite and mordenite. As will be demonstrated in an example, excellent results are obtained with the hydrogen form of mordenite.

The preferred procedure for suspending the crystalline aluminosilicate in the alumina matrix involves the preparation of an alumina sol and the addition of a finely divided crystalline aluminosilicate to the sol before it is formed into alumina particles. The term "finely divided" refers to a fine powder of crystalline aluminosilicate of about 100 or less mesh size on the Tyler standard screen scale. The aluminosilicates are thoroughly dispersed in the sol and then the resulting sol is formed into alumina particles by methods familiar to those skilled in the art—for example, see U.S. Patent 2,620,314.

An essential feature of the present invention is the concentration of the crystalline aluminosilicate in the alumina matrix. We have now found that a critical concentration of about 0.5 wt. percent to 1.5 wt. percent effects an improvement in temperature stability and in $C_5+$ yield when the resulting catalyst is used in a low pressure, sulfur-modified reforming system.

A preferred catalyst for the process of the present invention also contains combined halogen. This combined halogen may be either fluorine, chlorine, iodine, bromine, or mixtures thereof. Of these, fluorine and chlorine are preferred because of their superior compositing characteristics and their ready availability. The halogen may be added to the alumina matrix in any suitable manner, and either before, during, or after the addition of the catalytically active metallic component. For example, the halogen may be added as an aqueous solution of an acid, such as hydrogen fluoride, hydrogen chloride, hydrogen bromide, etc. At least a portion of the halogen may be composited with the alumina matrix during the impregnation of the latter with platinum group component; for example, through the utilization of a mixture of chloroplatinic acid and hydrogen chloride. In any event, the halogen will be typically composited in such a manner as to result in a final composite that contains about 0.1% to about 1.5% and preferably about 0.4% to about 0.9% by weight of halogen calculated on an elemental basis.

The platinum group component may be incorporated in the catalytic composite in any suitable manner; for example, by impregnation or by coprecipitation with an appropriate platinum group compound, such as chloroplatinic acid, platinum cyanide, platinum hydroxide, platinum sulfate, palladium sulfide, palladium, chloride, etc. Platinum is the preferred component; and it is generally added to the alumina matrix by commingling the latter with an aqueous solution of chloroplatinic acid. Following the impregnation technique the composite materials are dried and usually subjected to a high temperature calcination, or oxidation procedure. Similarly, additional treatment such as reduction and/or sulfiding may be performed on the resultant composite if desired, preferably according to the procedure given in the teachings of U.S. Patent No. 3,296,119.

It is understood that the catalytic composite, for utilization in the process of the present invention, may be manufactured in any suitable manner and that the precise method of manufacture is not considered to be a limiting feature of the present invention. Likewise, it is understood that the catalyst may be present in any desired shape, such as: spheres, pills, pellets, extrudates, powders, etc.

Accordance to the present invention, the hydrocarbon stream and hydrogen are contacted with the reforming catalyst in a conversion zone. This may be accomplished using fixed bed systems or moving bed systems; however, in view of the danger of attrition losses of the valuable catalyst and of well-known operational advantages, it is preferred to use a fixed-bed system. In this system, a hydrogen-rich gas and the charge stock are preheated by any suitable heating means to the desired reaction temperature and are passed, in admixture with a reducible sulfur-containing compound, into a conversion zone containing a fixed bed of the catalyst type previously characterized. It is, of course, understood that the conversion zone may be one or more separate reactors with suitable reheating means therebetween to compensate for the endothermic nature of the aggregate of the reactions taking place therein. It is also to be noted that the reactants may be contacted with the catalyst bed in either upflow, downflow or radial flow fashion with the latter being preferred.

Regardless of the exact procedure used in the reforming zone, the products from the zone are passed through condensing means to a separating zone typically maintained at about 100° F., wherein a hydrogen-rich gas is separated from a high octane liquid product, commonly designated as a "reformate." Preferably at least a portion of the hydrogen-rich gas is withdrawn and passed through an adsorption zone containing an adsorbent selective for water and recycled through suitable compressing means to the reforming zone. It is also within the scope of the present invention to remove by any suitable means both hydrogen sulfide and water from the hydrogen-rich gas before it is recycled in order to facilitate control of the sulfur level in the reforming zone. In any event, the reformate is withdrawn from the separating zone and commonly treated in a fractionation system in order to adjust its butane concentration.

As indicated previously, a singular feature of the present invention is the capability to operate in a stable fashion at low pressure. In the past, as previously explained, it has been the practice to operate at high pressure primarily to provide sufficient hydrogen to saturate hydrocarbon fragments generated during the reforming process and to prevent excessive carbon deposition on the catalyst with the attendant decline in activity for the upgrading reactions of interest. We have not found that a stable operation is achieved using the process of the present invention at pressures in the range of about 50 to about 250 p.s.i.g. and preferably about 75 to about 200 p.s.i.g. The exact selection of the pressure within these ranges is made primarily as a function of the tractability characteristics of the particular charge stock being subjected to the process of the present invention.

The temperature required in the reforming zone is generally lower than that required for a similar high pressure operation. This significant and desirable feature of the present invention is a consequence of the inherent selectivity of the low pressure operation for the octane-upgrading reactions as previously explained. In the past, when high octane was required, it typically was the practice to run at higher temperatures in order to produce more hydrocracking of paraffins and thus concentrate the available aromatics in the product stream; however, this high cracking activity is not needed to make octane in the process of the present invention. Accordingly, the present process requires a temperature in the range of about 850° F. to about 1100° F. and preferably about 900° F. to about 1050° F. As is well known to those skilled in the reforming art, the initial selection of the temperature within this broad range is made primarily as a function of the desired octane in the product reformate considering the characteristics of the charge stock and of the catalyst. Ordinarily, the temperature is slowly increased during the run to compensate for the inevitable deactivation that occurs and to provide for a constant octane product.

The hydrogen necessary for the present invention is supplied to the reforming zone at about 2 to about 20 moles per mole of hydrocarbon in the charge stock. Excellent results are obtained when about 7 to about 10 moles of hydrogen are used for each mole of hydrocarbon in the feed stock. Likewise, the liquid hourly space velocity used herein is selected from the range of about 0.1 to about 5.0 $hr.^{-1}$ with a value of about 0.3 to about 2.0 $hr.^{-1}$ being preferred.

An extraordinary feature of the process of the present invention is the infrequency with which the catalyst must be regenerated relative to ordinary low pressure operations. Previously, low pressure operations have required extensive regenerating facilities if the associated catalyst is to be used without replacement for an economic period of time. The process of the present invention, since it achieves reasonable stability at low pressure with accompanying low catalyst fouling rate, can be built without extensive regenerating facilities, such as swing-bed reactors, thereby effecting great savings in initial investment. An additional incentive for avoiding frequent regeneration in the substantial danger of injecting small amounts of water into the system from the regeneration operation. Accordingly, stringent precautions must be taken to insure that the reforming system is substantially free of water after the infrequent regeneration operations are performed.

The following example is given to illustrate further the improved process of the present invention, and to indicate the benefits resulting from the utilization thereto. It is understood that this example is given for the sole purpose of illustration.

EXAMPLE

This example demonstrates the improved results associated with the present invention by contrasting the results obtained in a high stress evaluation test of a sulfur-modified, substantially water-free reforming process, using a series of platinum-containing, alumina-supported catalysts having a varying concentration of a mordenite-type crystalline aluminosilicate contained in the supporting alumina matrix.

The catalysts are prepared by digesting high purity aluminum in hydrochloric acid to form a sol having an Al/Cl ratio of about 1.15. The sol is mixed with an aqueous solution of hexamethylenetetramine and divided into 6 portions which are labeled A through F respectively and from which corresponding catalysts A through F are to be prepared.

A powdered hydrogen form of mordenite is then added to portions B through F in amounts calculated to ultimately result in catalyst B through F containing respectively the wt. percent mordenite concentration in their associated alumina matrix as given in Table I. This powdered, finely divided mordenite is analyzed and found to contain 11.6 wt. percent $Al_2O_3$, 87.7 wt. percent $SiO_2$, 0.21 wt. percent Na, and between 0.01 wt. percent to 0.04 wt. percent of Ca. The mordenite is thoroughly dispersed therein such that it is essentially uniformly distributed throughout the sols.

The resulting sols are then separately passed through a vibrating dropping head and dropped into a forming oil. The rate of vibration and the volumetric flow of the sol are set to produce finished spherical particles of about 1/16 inch in diameter. This particle forming step is essentially conducted according to the teachings of U.S. Patent No. 2,620,314 and reference may be had to it for additional details as to the preparation of the alumina matrix for the respective catalyst.

The resulting alumina particles are separately impregnated with a solution of chloroplatinic acid and hydrochloric acid, dried, oxidized, prereduced, and presulfided—all of these steps are performed in accordance with the teachings of E. J. Bicek in U.S. Patent No. 3,297,119 and reference may be had thereto for the mechanics of each step. Analysis of the resulting catalyst particles are given in Table I.

TABLE I.—PROPERTIES OF CATALYSTS

| Catalyst | Mordenite, wt. percent | ABD | Pt, wt. percent | Cl, wt. percent | S, wt. percent |
|---|---|---|---|---|---|
| A | 0 | 0.515 | 0.75 | 0.84 | 0.19 |
| B | 0.5 | 0.520 | 0.75 | 0.80 | 0.20 |
| C | 1.0 | 0.526 | 0.75 | 0.72 | 0.27 |
| D | 1.5 | 0.520 | 0.75 | 0.80 | 0.20 |
| E | 2.0 | 0.514 | 0.75 | 0.92 | 0.11 |
| F | 5.0 | 0.502 | 0.60 | 0.80 | 0.13 |

As can be seen from Table I, the wt. percent mordenite in the alumina matrix of the catalyst particles varied from zero for the control (i.e. catalyst A) to 5.0 wt. percent for catalyst F.

A laboratory scale model of a reforming system is used in a high stress evaluation test of each of the catalysts. It essentially consists of: a block type of isothermal reactor, a hydrogen separating zone, a debutanizer fractionation column, and suitable heaters, condensers, etc. In this plant, the charge stock and a recycle hydrogen stream are admixed, heated to the desired conversion temperatures, and passed into contact with a fixed bed of the catalyst maintained in the reactor. An effluent stream is withdrawn from the reactor, cooled to about 100° F. and passed into the separating zone wherein a hydrogen-rich gas phase separates from a liquid phase. The hydrogen-rich gas phase is withdrawn and passed over a high surface area sodium scrubber, designed to remove substantially all $H_2O$ and $H_2S$, and recycled to the reactor; and the liquid phase is charged to a debutanizer column wherein a $C_1$ to $C_4$ overhead fraction and a $C_5+$ bottoms fraction are recovered.

The charge stock used in this series of tests is characterized in Table II; it is a heavy Kuwait naphtha and is specially treated with a high surface area sodium adsorbent in order to obtain an ultra dry feed containing less than 5 wt. p.p.m. of water. To the charge stock for all runs, there is added 600 wt. p.p.m. of sulfur as tertiary butyl mercaptan. Accordingly, the reactor is maintained substantially free of water and has about 600 p.p.m. of sulfur entering thereto throughout all of the runs.

TABLE II—PROPERTIES OF HEAVY NAPHTHA

| Property | Unit | Value |
|---|---|---|
| (1) °API gravity, 60°/60° F. | | 62.0 |
| (2) Engler distillation: | | |
| IBP | ° F. | 172 |
| 5% | ° F. | 188 |
| 30% | ° F. | 217 |
| 50% | ° F. | 240 |
| 70% | ° F. | 268 |
| 95% | ° F. | 315 |
| EP | ° F. | 362 |
| (3) Paraffins, vol. percent | | 75 |
| (4) Naphthenes, vol. percent | | 16 |
| (5) Aromatics, vol. percent | | 9 |

All runs consist of 6 periods of 24 hours and are made at a pressure of 100 p.s.i.g., a liquid hourly space velocity of 1.5, a recycle ratio of moles of hydrogen to moles of hydrocarbon in the feed of about 8.5, and a temperature sufficient to sustain an octane level in the recovered $C_5+$ reformate, of 100 F–1 clear. It is to be emphasized that these conditions are especially chosen to provide a high stress test of the catalyst designed to reveal information about the stability characteristics.

The results of the comparison tests are shown in Table III in terms of the temperature and $C_5+$ vol. percent yield obtained in periods 1 and 6 for each of the catalysts of Table I. Also reported are the differences in temperature and $C_5+$ yield over the test period and the corresponding increment in $\Delta T$, reported on a barrel of charge per pound of catalyst basis, necessary to sustain octane level. This last parameter provides a convenient measure of activity stability, especially when it is compared to the performance of the reference catalyst, catalyst A, which is representative of the performance to be expected from a high quality reforming catalyst. A quantitative comparison with catalyst A is given in the last column of Table III, from which it is evident that having about 0.5 wt. percent to about 1.5 wt. percent of mordenite in the alumina matrix of the reforming catalyst effects an improvement in temperature stability of between 10% to about 25% of that experienced with the reference catalyst. Moreover, this improvement in temperature stability is achieved without a corresponding $C_5+$ vol. percent yield penalty; in fact, $C_5+$ yield appears to increase slightly under these conditions providing an additional incentive for operating in conformance with the present invention.

TABLE III.—RESULTS OF COMPARISON TESTS

| Catalyst | Wt. percent Mordenite | T. (1), ° F. | T. (6), ° F. | ΔT., ° F. | $C_5+$ (1) LV percent | $C_5+$ (6) LV percent | $\Delta C_5+$ LV percent | ΔT/BPP | ΔT/BPP/ (ΔT/BPP) Catalyst A |
|---|---|---|---|---|---|---|---|---|---|
| A | 0 | 954 | 973 | 19 | 74.9 | 74.1 | −0.8 | 16.4 | 1.0 |
| B | 0.5 | 955 | 972 | 17 | 75.0 | 74.1 | −0.9 | 14.7 | 0.90 |
| C | 1.0 | 956 | 971 | 15 | 76.0 | 75.4 | −0.6 | 12.1 | 0.74 |
| D | 1.5 | 954 | 970 | 16 | 76.0 | 75.7 | −0.3 | 13.8 | 0.84 |
| E | 2.0 | 951.5 | 972.0 | 20.5 | 75.5 | 74.7 | −0.8 | 18.0 | 1.10 |
| F | 5.0 | 950.5 | 974.5 | 24.0 | 72.4 | 72.3 | −0.1 | 20,6 | 1.26 |

We claim as our invention:

1. In a low pressure process for reforming a hydrocarbon stream boiling in the gasoline range, wherein the hydrocarbon stream and hydrogen are contacted in a conversion zone with a platinum metal-containing catalyst at reforming conditions including a pressure of about 50 to about 250 p.s.i.g.; wherein the conversion zone is continuously maintained substantially free of water; and wherein the contacting is performed in the presence of sulfur which is continuously entering the conversion zone in an amount of about 10 to about 3,000 p.p.m. by weight of the hydrocarbon stream; the improvement comprising utilizing a reforming catalyst containing a platinum metal composited with an alumina matrix having a finely divided hydrogen form mordenite suspended therein in an amount of about 0.5 to about 1.5 wt. percent of the alumina matrix.

2. The process of claim 1 further characterized in that said hydrocarbon stream is a naphtha containing paraffins and naphthenes.

3. The process of claim 1 further characterized in that said platinum metal is platinum which is present in an amount of about 0.01 wt. percent to about 3.0 wt. percent of the catalyst.

4. The process of claim 1 further characterized in that said reforming catalyst contains a halogen component in an amount of about 0.1 wt. percent to about 1.5 wt. percent of the catalyst.

5. The process of claim 1 further characterized in that said sulfur enters the conversion zone in the form of a reducible sulfur-containing compound.

6. The process of claim 5 further characterized in that said reducible sulfur-containing compound is a mercaptan.

7. The process of claim 1 further characterized in that said reforming conditions include a temperature of about 850° F. to 1100° F.

8. The process of claim 1 further characterized in that said reforming conditions include a liquid hourly space velocity of about 0.3 to 2.0 $hr.^{-1}$.

References Cited

UNITED STATES PATENTS

| | | | |
|---|---|---|---|
| 2,952,611 | 9/1960 | Haxton et al. | 208—65 |
| 3,006,841 | 10/1961 | Haensel | 208—139 |
| 3,376,214 | 4/1968 | Bertolacini et al. | 208—138 |
| 3,376,215 | 4/1968 | Bertolacini et al. | 208—138 |

HERBERT LEVINE, Primary Examiner

U.S. Cl. X.R.

208—139; 252—455